United States Patent
Aguilar, Jr. et al.

(10) Patent No.: US 7,650,601 B2
(45) Date of Patent: Jan. 19, 2010

(54) OPERATING SYSTEM KERNEL-ASSISTED, SELF-BALANCED, ACCESS-PROTECTED LIBRARY FRAMEWORK IN A RUN-TO-COMPLETION MULTI-PROCESSOR ENVIRONMENT

(75) Inventors: Maximino Aguilar, Jr., Austin, TX (US); Alex C. Chow, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 950 days.

(21) Appl. No.: 10/729,463

(22) Filed: Dec. 4, 2003

(65) Prior Publication Data

US 2005/0125793 A1    Jun. 9, 2005

(51) Int. Cl.
*G06F 9/46* (2006.01)

(52) U.S. Cl. .................... 718/104; 718/103; 718/106

(58) Field of Classification Search ............. 709/102, 709/201; 718/100, 102, 103–104, 106, 105
See application file for complete search history.

(56) References Cited

U.S. PATENT DOCUMENTS

| | | | |
|---|---|---|---|
| 4,466,064 A * | 8/1984 | Martin | 712/13 |
| 5,465,335 A | 11/1995 | Anderson | |
| 5,469,571 A | 11/1995 | Bunnell | |
| 5,729,710 A * | 3/1998 | Magee et al. | 711/203 |
| 5,826,080 A | 10/1998 | Dworzecki | |
| 5,938,708 A | 8/1999 | Wallace et al. | |
| 5,940,612 A | 8/1999 | Brady et al. | |
| 2001/0051971 A1 * | 12/2001 | Kato | 709/102 |
| 2002/0010732 A1 * | 1/2002 | Matsui et al. | 709/107 |
| 2002/0091752 A1 * | 7/2002 | Firlie | 709/201 |
| 2002/0133530 A1 * | 9/2002 | Koning | 709/102 |

OTHER PUBLICATIONS

David L. Cohn et al., "Protection by Hiding: Eliminating the Need for Kernel Mode," Department of Computer Science and Engineering, University of Notre Dame, pp. 1-6 (1997).
Deborah T. Marr et al., "Hyper-Threading Technology Architecture and Microarchitecture," Intel Technology Journal Q1, pp. 1-12 (2002).

* cited by examiner

*Primary Examiner*—Meng-Ai An
*Assistant Examiner*—Camquy Truong
(74) *Attorney, Agent, or Firm*—Ryan K. Simmons (57) ABSTRACT

A method for managing multiple processors in the execution of one or more processes in a task-based library platform. The one or more processes are partitioned into highly granulized sub-tasks from a library calling process, whereby each sub-task has a protection attribute associated with it. The protection attribute designates processing resources that a processor may use in the execution of the sub-task. The sub-tasks are placed in a central task queue, whereby idling processors in the multiple processor system obtain consecutive sub-tasks in the queue until all the processes have been executed. Each processor executes a sub-task using only those processing resources that have been designated as being available by the protection attribute of the sub-task. The atomic execution results of the one more sub-tasks may then be combined into an execution result for the process. Also provided is a task-based library for processor management.

16 Claims, 4 Drawing Sheets

OPERATING SYSTEM KERNEL-ASSISTED, SELF-BALANCED, ACCESS-PROTECTED LIBRARY FRAMEWORK IN A RUN-TO-COMPLETION MULTI-PROCESSOR ENVIRONMENT

TECHNICAL FIELD

The present invention relates generally to multi-processor computational resource management and, more particularly, to a library framework for providing access-protected management of multi-processor resources in performing atomic sub-tasks in a run-to-completion manner.

BACKGROUND OF THE INVENTION

In the field of computer resource management, the allocation of processor resources is performed in several ways. In single processor environments, the execution of a plurality of tasks may include the designation of each of the plurality of tasks as being of a certain priority level. The tasks are arranged in a queue and are subsequently provided to a processor that executes the tasks serially, giving each task a pre-emptive time-share of processing resources. During the execution of a task, a test may be performed in order to determine whether there are any tasks in the queue that are of a higher priority than the current task being executed. If the management system determines that there are tasks of higher priority than the current task being executed, then the current task may be desirably terminated and placed back into the queue in order to provide the higher priority task to the processor for execution. In this manner, the management system can provide desirably prompt execution of the highest priority tasks. This type of system is known as an interrupt system, and the switching of a task being executed from a lower priority task to a higher priority task is known as context-switching.

Within a single processor computer system, this type of operation is referred to as multitasking, and generally enables the virtual parallel execution of tasks on a single processor. In such a system, the multitasking operation is controlled by the kernel of an operating system ("OS"), where the kernel acts as an interface between the central processing unit ("CPU") and the tasks to be executed. The kernel schedules the execution of the tasks such that the processor is shared between all of the tasks in the system. Accordingly, the kernel controls queue scheduling and priority handling, as described above.

The invention disclosed in U.S. Pat. No. 5,469,571 issued to Bunnell is an operating system architecture using multiple priority kernel task based interrupt handling. The kernel includes a scheduler which selects tasks for execution based on relative priority levels. The disclosure applies to the single processor environment.

Despite the desirably prompt performance of high priority tasks, the interrupt-based resource management systems described above present many drawbacks. Such drawbacks may include, for example, the loss of processing power and overhead incurred in the partial execution of a lower priority task that is terminated in order to process a higher priority task. Generally, this problem may be overcome by saving the progress of the lower priority task to, for example, a system memory and later restoring the progress when the task is ready to be finished. This saving step presents an undesirable need for large amounts of memory space, however, to store the progress of the lower priority task. Furthermore, the decision to terminate a lower priority process for a higher priority process may be performed several times, resulting in a plurality of partially processed tasks, each of which is undesirably using space in the memory. Another method of avoiding the problem identified above is in executing tasks in the processing queue in a run-to-completion fashion, whereby each task, once provided to the processor, cannot be recalled until it has been completely executed. This method may provide a further disadvantage in that higher priority tasks are no longer given precedence in execution and, therefore, are delayed by the execution of lower priority tasks.

A more desirable system for managing computing resources in execution of a plurality of tasks may organize the processing queue in such a fashion that the highest priority tasks are always ahead of the lower priority tasks, thereby reducing the need for interrupt systems and context switching. Such a system encounters a problem, however, when tasks, task priorities, or both are being added or changed in real time. This problem may undercut the expected efficiency of the originally organized queue and presents the need for continuous, real-time reorganization of the processing queue. Such a real-time reorganizing effort may be undesirably inefficient due to a relatively large size of the processing queue, as well as the low latency associated with sending and receiving tasks to and from the queue. Thus, it may be difficult to coordinate a full reorganization of the processing queue according to changes in the tasks and task priority before an occurrence of a further change in one or more tasks or task priorities, because such changes may be rapidly occurring.

The invention disclosed in U.S. Pat. No. 5,465,335 issued to Anderson relates to a multitasking data processing system that is provided with an operating system kernel. An event queue in the kernel stores task names awaiting placement in the processor queue. When an associated processor signals the occurrence of an event, matching logic searches all stores in the event queue, in parallel, to find a task associated with the signaled event and then transfers the task to the processor queue.

A further method that has been developed to overcome the undesirable aspects of single processor multitasking is a method known as multithreading. Multithreading is the sharing of a single processor between multiple tasks (i.e., threads) in a way designed to minimize the time required for context switching. This advantage is accomplished by sharing as much of the program execution environment as possible among different tasks in order to reduce the amount of task execution data that needs to be saved and restored when changing threads. Although multitasking attempts to hide thread resources corresponding to different threads, multithreading attempts to share as much of their environment as possible. Extensive multithreading may share, for example, a single address space and global variables set for separate threads distinguished only by the value of their program counts or stack pointers. Generally, multithreading may be used for very fine-grain tasks incorporating only a few basic instructions, so that resource management is desirably uncomplicated and less susceptible to errors. The extensive sharing of resources among the different threads being executed may render inadequate, however, the protection of resources dedicated to one thread from the execution of a different thread.

In order to overcome the inefficiencies of single-processor execution of a plurality of tasks, several systems utilizing multi-processor environments have been introduced and are now prevalent in the art. Such systems may utilize one or more processing queues in order to desirably provide a plurality of tasks to a plurality of processors available for computing, where the plurality of processors may have one or more dedicated processing resources and shared processing resources. The use of multi-processing also requires, however, an efficient and effective organization of the processing queue.

This requirement may be achieved through the use of multiple queues. The invention disclosed in U.S. Pat. No. 5,940,612 issued to Brady et al., for example, organizes tasks into multiple queues. Each queue represents a priority level and all tasks assigned to that queue are of that queue's designated priority level. The tasks are then sent to one or more processors for run-to-completion execution. Those tasks within the highest priority level queue are executed first. This system inherently provides real-time scheduling of tasks, whereby the organization of tasks into priority queues allows sequential execution of those tasks that have the highest priority down to those that have the lowest priority. When the highest priority queue is empty, the process will attempt to execute a task from the next highest priority queue, and so on. Therefore, in a situation where a higher priority queue is empty, a task from a lower priority queue may be executed. If one or more higher priority tasks are then added during the execution of the lower priority task, those higher priority tasks will be the next to be executed.

The method does not require an explicit reorganization and scheduling of an entire single queue in order to obtain an efficient execution of high priority tasks over lower priority tasks. The scheduling is automatically provided through the use of multiple priority queues which are drained sequentially. Such an implementation may provide several disadvantages such as, for example, an undesirable amount of time taken to evaluate the readiness of tasks within the multiple processing queues.

The invention disclosed in U.S. Pat. No. 5,938,708 issued to Wallace et al. relates to a multitasking operating system for a plurality of event queues under control of an event dispatcher, where the kernel dispatches events corresponding to processes. The invention is disclosed as including a single processor to execute a state-driven process that has control over the processor, or to execute a process not included in any state, such as a process of detecting vehicular collision. The invention also provides for assigning priority levels to the various processes.

U.S. Pat. No. 5,826,080 issued to Dworzecki is directed to a method of scheduling tasks to be executed in a serial processing system. The invention manages the sequence of tasks that must be executed serially by organizing them into execution queues representing processing time slots that correspond to desired run times for the tasks, respectively. Furthermore, the tasks may be formed into priority layers within an execution queue according to the order in which they must be performed.

A further problem that may arise in multi-processor environments is that of processor resource allocation and protection. In a multi-processor system, one or more processing queues may provide one or more tasks to the processors; the one or more tasks may be required to use the same processing resources. Although each processor in a multi-processor system has its own set of private processing resources, it also has access to a set of shared resources that are shared among the plurality of processors. Therefore, when multiple processors attempt to use the same resources in execution of a task, the entire multi-processing system may crash. In order to prevent such undesirable system crashes, a multi-processor system requires many levels of data communication among processors to avoid resource use conflicts, processor overloading, and processor idleness. Such a complicated system may be undesirably prone to errors. Furthermore, the data communication among processors may undesirably increase data latency and execution time, and decrease available bandwidth.

It may be recognized by those skilled in the art that the aforementioned task scheduling techniques and corresponding undesirability may generally relate to physical multi-processor and single-processor architectures, as well as virtual multi-processor architectures, such as those introduced by Intel Corporation's Hyper-Threading Technology. There remains a need, therefore, to overcome the shortcomings of existing systems for managing multiple processors in the execution of one or more processes in a task-based library platform.

SUMMARY OF THE INVENTION

To meet this and other needs, and in view of its purposes, the present invention provides a task-based library comprising processors having computational resources centrally managed and load balanced, managed processors accessing only resources allocated to associated processes, and a library layer to hide parallel programming complexity from an application programmer.

In a further embodiment, a task-based library for processor management receives tasks to be executed, wherein a task atomizer atomizes the tasks into one or more atomic sub-tasks, and an access rights generator assigns protection attributes to the tasks designating access rights to one or more processing resources to be used in executing the tasks. The present invention may further include a central task queue for storing the one or more atomic sub-tasks waiting to be executed and a task scheduler for arranging the one or more atomic sub-tasks into the central task queue.

In an alternate embodiment, a method of task management is provided. The method comprises the steps of receiving one or more tasks to be executed, atomizing the one or more tasks into one or more atomic sub-tasks, and designating access rights to one or more computing resources for each atomic sub-task of the one or more atomic sub-tasks.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
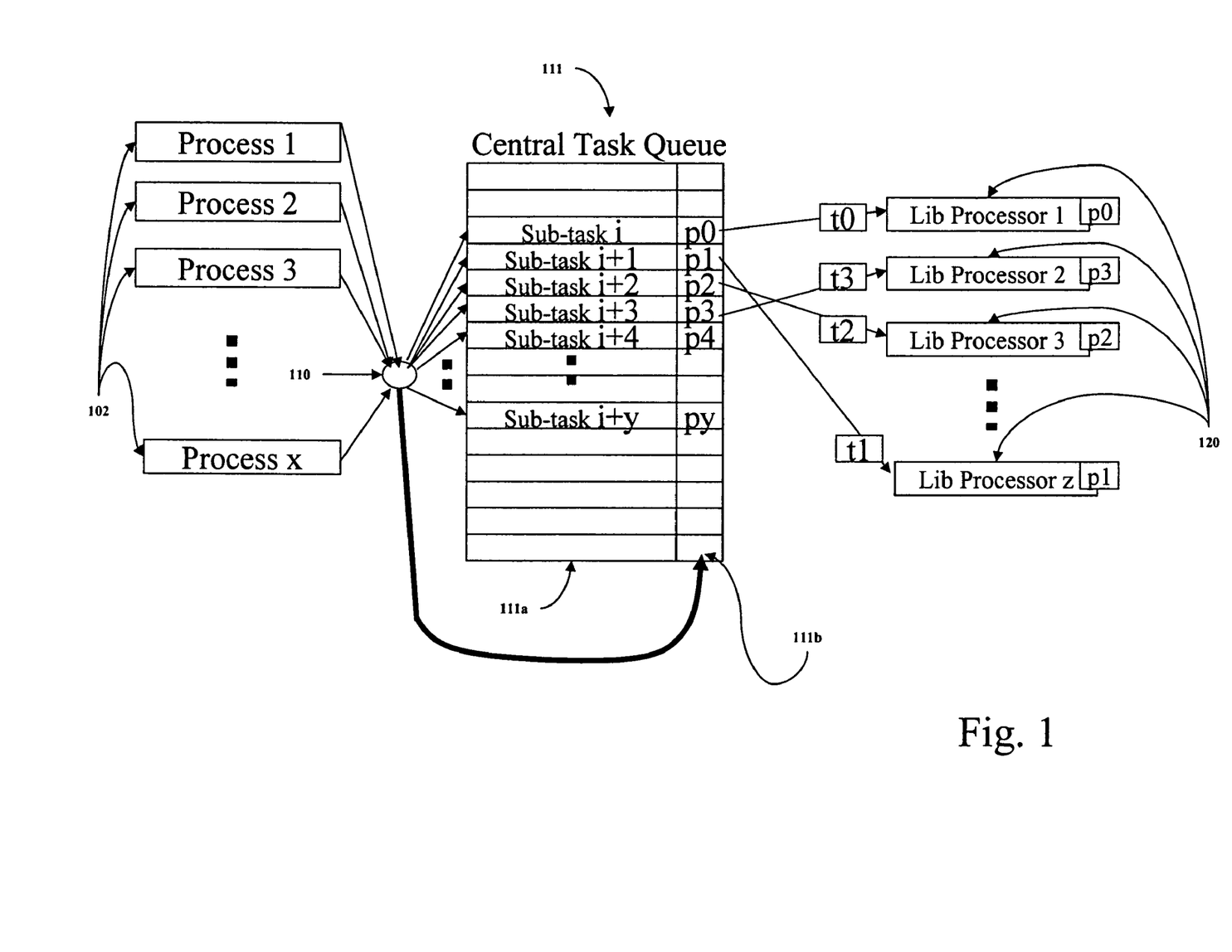
FIG. 1 is a flow diagram of a method of processor management and task assignment in accordance with an embodiment of the present invention.

Referring now to the drawing, in which like reference numbers refer to like elements throughout the various figures that comprise the drawing, FIG. 1 is flow diagram of an exemplary embodiment of the present invention. In the exemplary embodiment, processes 102 identified as Process 1, Process 2, Process 3 through Process x arrive as part of one or more commands that have been sent for execution. These processes 102 are then atomized by the kernel 110 into one or more atomic sub-tasks that are mapped out by the kernel 110 and placed into a central task queue 111 that includes each sub-task 111a as well as a protection attribute 111b. A series of library processors 120 obtain sub-tasks 111a and corresponding protection attributes 111b from the central task queue 111 upon becoming idle.

In an exemplary embodiment, the task-based library system receives a process 102 and kernel 110 maps out the process 102 into one or more sub-processes 111a that correspond to atomic sub-tasks stored in the library (not shown in FIG. 1). The kernel 110 also associates a protection attribute 111b to each of the one or more sub-processes 111a to designate the processing resources available for execution of the corresponding sub-process 111a. For example, those skilled in the art will recognize that a process that involves simple arithmetic (e.g., x=5+5), may involve several atomic sub-tasks to execute, such as register renaming and assigning variables in memory. For even simple commands such as a loop, there will be many atomic sub-tasks that will correspond to its execution.

In order to hide such programming complexity, the many atomic sub-tasks that are possible are stored into a library. It is the job of the kernel 110 to atomize a given process (e.g., a loop in C++) into the temporal sequence of its atomic sub-tasks whose sequential operation corresponds to operation of the given process (e.g., unrolling a loop in assembly language). The kernel 110 then arranges these atomic sub-tasks into the central task queue 111 based on their sequential execution as well as any assigned priorities. Therefore, it may be desirable that high priority processes have one or more of their atomic sub-tasks placed ahead of the atomic sub-tasks of lower priority processes.

It may occur that the execution of library task i+1 depends on the results of library task i, and an idle processor waits to grab library task i+1, but library task i has not been completed. If so, the idling processor will grab the next independent task in the central task queue 111 assuming there are more independent than dependent tasks. This priority is usually the case in a server environment.

After a given process 102 has been atomized to one or more atomic sub-tasks 111a, a library caller invokes a system call of the kernel 110 that places the task 111a onto the central task queue 111. Tasks 111a on the central task queue 111 are then generally executed first-in-first-out (FIFO), but those skilled in the art may recognize that other queue execution algorithms may also be used without departing from the spirit of the invention. The kernel 110 also associates protection attributes 111b with each of the queued atomic sub-tasks 111a. Protection attributes 111b designate one or more processing resources (e.g., a range of memory addresses) that may be used in the execution of a given atomic sub-task 111a. The association of a set of protection attributes 111b to a given atomic sub-task 111a desirably prevents processing resource usage conflicts when one or more atomic sub-tasks 111a are being executed in parallel.

The protection attributes 111b are generated from the caller processor generating the tasks 111a. When a task 111a is completed and the result is returned to the caller, the information of the protection attribute 111b is discarded. The resource used by the processed task 111a then may be reused.

The execution of atomic sub-tasks in the queue is carried out by one or more library processors 120. When a given library processor 120 becomes idle, it proceeds to obtain an atomic sub-task 111a from central task queue 111. As it obtains the atomic sub-task 111a to execute, the library processor 120 also acquires the protection attribute 111b corresponding to the atomic sub-task 111a. Therefore, in execution of the atomic sub-task 111a, the library processor 120 only uses those processing resources designated in the protection attribute 111b.

In a system with a plurality of library processors 120, each library processor 120 fetches tasks in the central task queue 111 as soon as it becomes idle. In the embodiment of FIG. 1, at time t0, library processor 1 is in an idle state and therefore obtains atomic sub-task i from central task queue 111 and also inherits protection attribute p0 corresponding to sub-task i. Library processor 1 then executes sub-task i in a run-to-completion manner using only those resources designated by protection attribute p0. While library processor 1 is performing sub-task i, library processor z is the next processor to become idle and, therefore, library processor z proceeds to obtain sub-task i+1 from central task queue 111 and also inherits protection attribute p1. Library processor z subsequently executes sub-task i+1 in a run-to-completion manner. At time t2, library processor 3 obtains sub-task i+2 and corresponding protection attribute p2, and subsequently executes sub-task i+2 in a run-to-completion manner. This process continues for library processor 2, which becomes idle at time t3 and, therefore, obtains sub-task i+3 and corresponding protection attribute p3. Any remaining idling processors, running in kernel mode, fetch each next sub-task 111a in the central task queue 111 and also obtain the associated protection attribute 111b for executing the sub-task 111a.

Therefore, it can be seen that in such an embodiment of the present invention, processes 102 become highly granulated as one or more atomic sub-tasks 111a, which are arranged temporally and prioritized in a central task queue 111. Generally, this embodiment may allow the faster execution of such processes 102 by one or more processors 120, because each processor 120 is only executing an atomic sub-task 111a of the process 102 as opposed to the entire process and is therefore able to make greater use of processing resources. Also, the association of protection attributes 111b to a given sub-task 111a designates the precise resources that a processor 120 is allowed to use in execution of a given sub-task 111a, thereby preventing undesirable conflicts in resource usage, as well as undesirable waste of idle resources.

Figure 2:
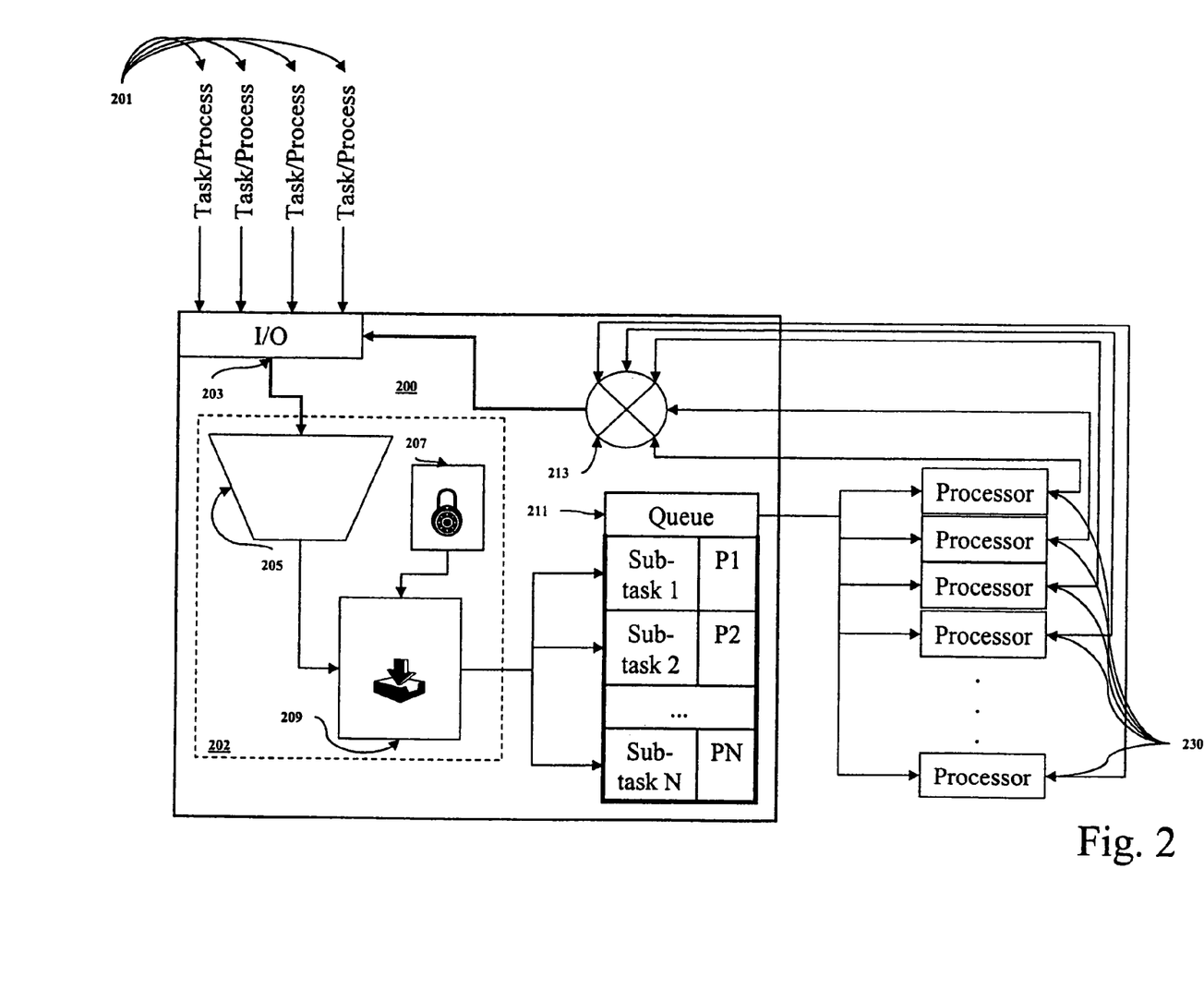
FIG. 2 is a plan view of an apparatus according to the present invention.

FIG. 2 shows an exemplary plan view of an embodiment of the present invention. Tasks (or Processes) 201 arrive at an input/output port 203 of the task-based library framework 200. Tasks 201 are routed to the library kernel 202. Within the library kernel 202, a task atomizer 205 atomizes tasks 201 into one or more sub-tasks that are mapped by a scheduler 209 pursuant to desirably temporal and prioritized execution of certain tasks and atomic sub-tasks. The scheduler 209 also obtains protection attributes for each sub-task from a protection attributer 207.

Upon mapping the one or more sub-tasks and associating protection attributes to each one of the one or more atomic sub-tasks, the scheduler 209 arranges each sub-task and corresponding protection attribute into a central task queue 211. One or more processors 230 then obtain sub-tasks and corresponding protection attributes from the central task queue 211 sequentially, according to the order in which processors 230 become idle. The processors 230 then execute their respective sub-tasks using only those processing resources designated by the protection attribute corresponding to the respective sub-task.

In a further embodiment of the present invention, a summing junction 213 may be used to desirably combine the execution results of one or more sub-tasks corresponding to an execution result of a task 201. In such an embodiment, the summing junction 213 may be part of the kernel 202, whereby the atomic execution results are combined into the execution results of a task 201, which is then routed to the input/output port 203 for delivery to the calling process.

As described above with respect to FIGS. 1 and 2, an embodiment of the present invention may be a task-based library for processor management. The task-based library comprises a mechanism for receiving tasks to be executed, a task atomizer for atomizing the tasks into one or more atomic sub-tasks, and an access rights generator for assigning protection attributes to the tasks designating access rights to one or more processing resources to be used in executing the tasks. In a further embodiment, the task-based library may include a central task queue for storing the one or more atomic sub-tasks waiting to be executed and a task scheduler for arranging the one or more atomic sub-tasks in the central task queue.

Figure 3:
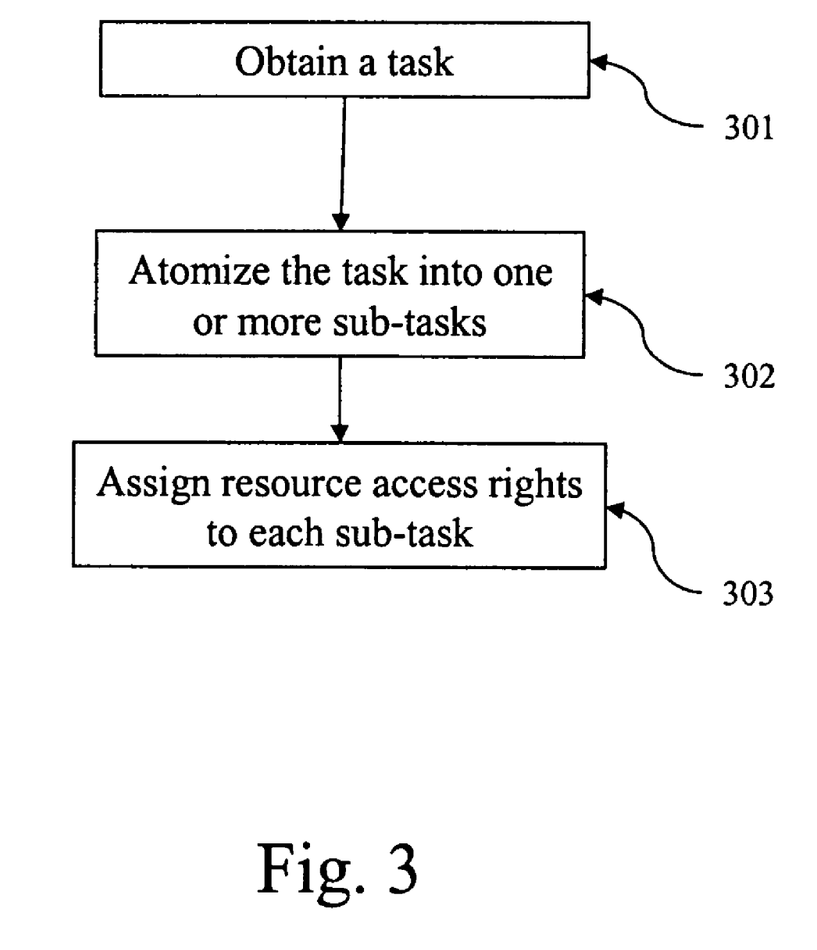
FIG. 3 is a flow chart of an exemplary method of processor management and task assignment according to the present invention.

It can be recognized that the method and algorithms by which the kernel organizes and arranges the atomic sub-tasks into the central task queue are not essential to the function of the present invention. The present invention introduces the high-level method of managing processing resources, however, as shown in the flowchart of FIG. 3. As illustrated, in step 301, the task-based library obtains a task (i.e., process) to be executed. Step 302 then atomizes the task into one or more atomic sub-tasks. Step 303 then serves to establish the protection attribute (i.e., resources rights) for each sub-task. The protection attribute designates precisely which processing resources may be used in the execution of the sub-task.

Figure 4:
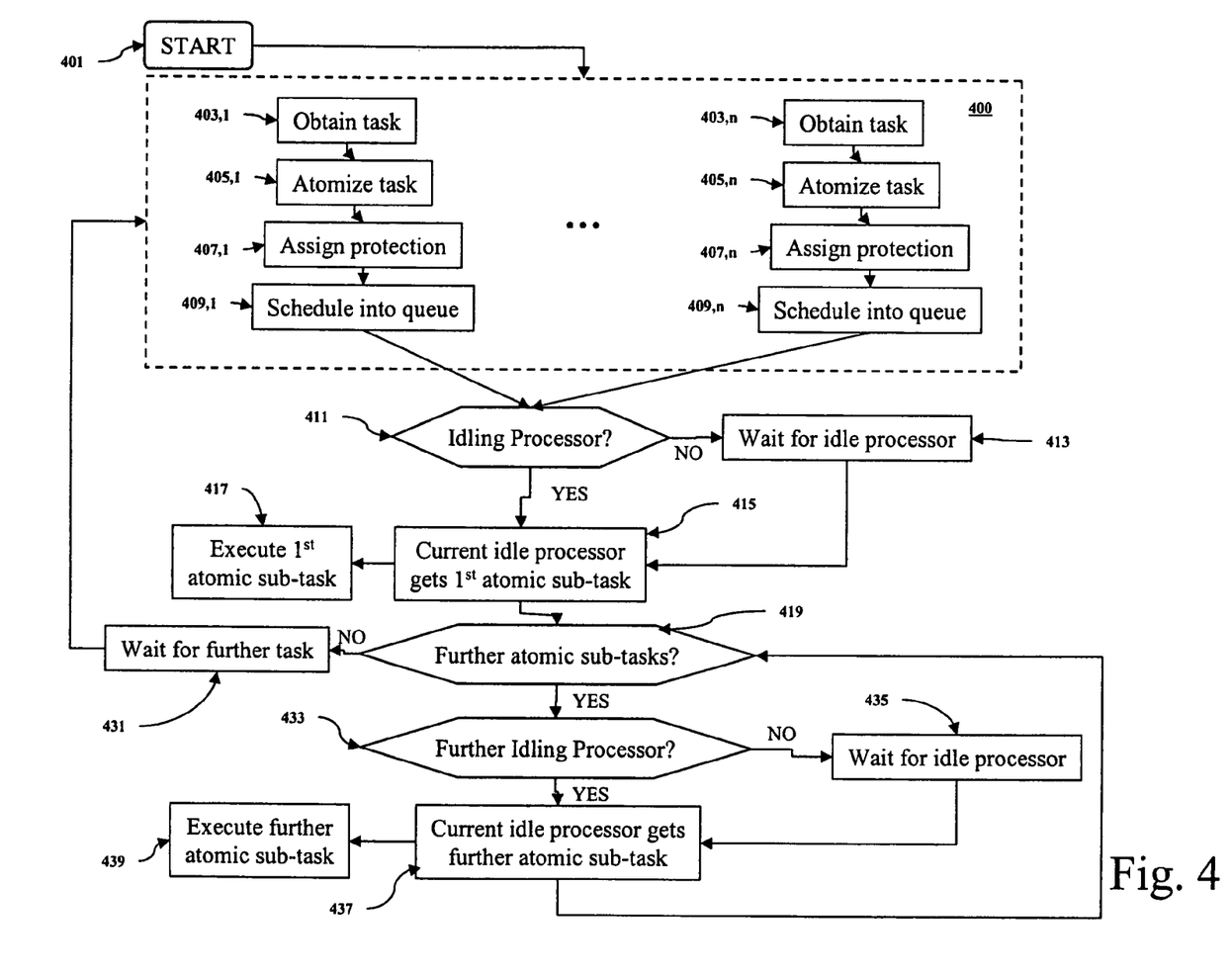
FIG. 4 is a flow chart of an alternate exemplary method of processor management and task assignment according to the present invention.

FIG. 4 is a flow chart illustrating an exemplary embodiment of the present invention. In such an embodiment, step 401 presents a start signal that begins the process by executing kernel operations 400. Step 403 obtains a task to be executed. Step 405 atomizes the task into one or more atomic sub-tasks. Step 407 assigns a protection attribute to each atomic sub-task of the one or more atomic sub-tasks. And step 409 schedules the one or more atomic sub-tasks into a central task queue pursuant to temporal and priority conditions of the one or more atomic sub-tasks.

As illustrated in FIG. 4, in general, any number of instances of the kernel may be run simultaneously so that operations 403,1 through 409,1 may operate in parallel with operations 403,n through 409,n. Such an implementation may require coordination, however, between the multiple instances of the kernel so that a unique protection attribute is not distributed to more than one atomic sub-task across the multiple instances of the kernel, and also so that the priority of atomic sub-tasks is addressed upon insertion into the central task queue. The problem of protection attributes described above may be addressed by only giving each instance of the kernel a certain range of processing resources from which it may designate protection attributes of a sub-task. Therefore, there will be no double-assignments of protection attributes across the multiple instances of the kernel.

The problem of addressing priorities may further be addressed by designating a master kernel that performs the scheduling of every other instance of the kernel, whereby the multiple instances of the kernel submit atomized sub-tasks and corresponding protection attributes to the master kernel, and the master kernel consolidates the priority and temporal execution parameters of each sub-task of the one ore more sub-tasks prior or concurrent to placing the one or more atomic sub-tasks into the central task-queue. It can be seen by those skilled in the art that the central task queue may comprise one or more task queues that may be partitioned according to differing priorities of tasks and/or differing execution timing of tasks. The same concept may be extended to multiple "virtual" kernels sharing the same pool of library processors (e.g., hypervisor). Thus, multiple instances of the kernel can be run according to this concept.

Subsequent or concurrent to the scheduling of tasks into the central task queue, step 411 determines if there are any idling processors that are waiting to execute a sub-task. If there are no idle processors, step 413 will wait until a processor becomes available, whereupon control will transfer to step 415. If there is an idle processor available, control will transfer to step 415 directly.

In step 415, the current idle processor obtains the first atomic sub-task in the central task queue, and control simultaneously proceeds to both steps 417 and 419. Step 417 executes the first atomic sub-task using only those resources designated by the protection attribute for the first atomic sub-task. Step 419 determines if there are further atomic sub-tasks in the central task queue that are ready to be executed. If there are no sub-tasks available, control transfers to step 431, which waits for further tasks to arrive at the kernel. If there are further tasks to be executed in step 419, control transfers to step 433, which determines if there are any further idling processors that are waiting to execute a sub-task.

If there are no further idle processors, step 435 will wait until a processor becomes available, whereupon control will transfer to step 437. If there is an idle processor available in step 433, control transfers directly to step 437, where the current idle processor obtains the further atomic sub-task in the central task queue. Control then simultaneously proceeds to both steps 439 and 419. Step 439 executes the further atomic sub-task. Steps 419-439 are then repeated sequentially until all the atomic sub-tasks in the central task queue have been desirably executed.

It can be seen that the embodiment shown in FIG. 4 generally executes in an infinite loop. Although not shown in FIG. 4, the process may be stopped at step 431 if there are no further tasks. Furthermore, in an alternate embodiment of the present invention, all execution results from one or both of steps 417 and 439 may be sent to an additional step (not shown) that desirably combines the atomic execution results from one or more atomic sub-tasks corresponding to a given task into an execution result for the given task.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed:

1. A method of task management using memory ranges of shared memory, comprising the steps of:
   a. executing multiple instances of a kernel;
   b. generating one or more tasks to be executed from a plurality of the instances of the kernel;
   c. atomizing the one or more tasks into one or more atomic sub-tasks;
   d. assigning protection attributes indicating a portion of one of the memory ranges of the shared memory for each respective atomic sub-task of the one or more atomic sub-tasks such that each respective sub-task is executed by one of a plurality of processors which inherits access rights to the shared memory indicated by the protection attributes corresponding to the respective atomic sub-task; and e. generating one or more groups of temporal related tasks from the one or more atomic sub-tasks, and prioritizing and connecting the one or more groups of temporal related tasks by their temporal relationship and inserting the each temporal related tasks of each of the one or more groups of temporal related tasks into a central task queue to be executed according to their temporal relationship by one or more of the plurality of processors, wherein each of the protection attributes corresponding to a common instance of the multiple instances of the kernel is assigned to a common memory range of the memory ranges and protection attributes corresponding to different instances of the multiple instances of the kernel are assigned to respectively different memory ranges of the shared memory.

2. The method according to claim 1, further comprising the step: scheduling the one or more atomic sub-tasks into a central task queue.

3. The method according to claim 2, wherein the step of scheduling the one or more atomic sub-tasks into the central task queue is done according to one or both of temporal and priority considerations.

4. The method according to claim 2, further comprising the step of:

obtaining from a first idle processor of the plurality of processors a first atomic sub-task from the central task queue, the first idle processor thereby inheriting the access rights to a first memory range of the shared memory in executing the first atomic sub-task.

5. The method according to claim 4, further comprising the step of:

obtaining from a further idle processor of the plurality of processor of the plurality of processors a further atomic sub-task from the central task queue, the further idle processor thereby inheriting the access rights to a further memory range of the shared memory in executing the further atomic sub-task.

6. The method according to claim 5, wherein steps of obtaining first and further idle processors are repeated until there are no further idle processors or no further atomic sub-tasks in the central queue.

7. The method according to claim 1, further comprising:
designating a master kernel;
submitting, by the multiple instances of the kernel, the one or more atomic sub-tasks to the master kernel;
scheduling, by the master kernel, all of the multiple other instances of the kernel;
consolidating priority and temporal execution parameters of each sub-task; and
placing the one or more sub-tasks into a central task-queue after the consolidating step.

8. The method according to claim 7, further comprising:
determining whether any of the plurality of processors are idle;
responsive to one of the processors being idle, receiving, by the processor determined to be idle, a first atomic sub-task using, the shared memory designated by the corresponding protection attribute; and
repeatedly and simultaneously determining whether another processor is idle and executing a subsequent atomic sub-task until all tasks are completed.

9. The method of claim 8, further comprising providing a summing junction as part of the kernel; and routing the combined execution results of the completed task to an input/output port for delivery to a calling process.

10. A task-based library for processor management for execution of multiple instances of a kernel configured to use memory ranges of shared memory, comprising:

means for receiving one or more tasks to be executed from the multiple instances of the kernel;

a task atomizer for atomizing the one or more tasks into one or more atomic sub-tasks;

a plurality of processors for executing the one or more atomic sub-tasks;

an access rights generator for assigning protection attributes indicating a portion of one of the memory ranges of the shared memory for each respective atomic sub-task of the one or more atomic sub-tasks such that each respective sub-task is executed by one of the plurality of processors which inherits access rights to the shared memory indicated by the protection attributes corresponding to the respective atomic sub-task, wherein each of the protection attributes corresponding to a common instance of the multiple instances of the kernel is assigned to a common memory range of the memory ranges and protection attributes corresponding to different instances of the multiple instances of the kernel are assigned to respectively different memory ranges of the shared memory; and a central task queue with one or more groups of temporal related tasks generated from the one or more atomic sub-tasks, the one or more groups of temporal related tasks prioritized and connected by their temporal relationship and are executed according to their temporal relationship by one or more of the plurality of processors.

11. The task-based library of claim 10, further comprising a central task queue for storing the one or more atomic sub-tasks waiting to be executed.

12. The task-based library of claim 11, further comprising a task scheduler for arranging the one or more atomic sub-tasks in the central task queue.

13. A method of task management for execution of multiple instances of a kernel using memory ranges of shared memory, comprising the steps of:

a. receiving one or more tasks to be executed from the multiple instances of the kernel;

b. atomizing the one or more tasks into one or more atomic sub-tasks;

c. assigning protection attributes indicating a portion of one of the memory ranges of the shared memory for each respective atomic sub-task of the one or more atomic sub-tasks such that each respective sub-task is executed by an idle processor of a plurality of processors which inherits access rights to the shared memory indicated by the protection attributes corresponding to the respective atomic sub-task;

d. scheduling the one or more atomic sub-tasks into a central task queue according to one or both of temporal and priority considerations;

e. obtaining via a first idle processor of the plurality of processors a first atomic sub-task from the central task queue for execution of the first atomic sub-task;

f. obtaining via a further idle processor of the plurality of processors a further atomic sub-task from the central task queue for execution of the further atomic sub-task; and g. generating one or more groups of temporal related tasks from the one or more atomic sub-tasks, and prioritizing and connecting the one or more groups of temporal related tasks by their temporal relationship and inserting each temporal related tasks of each of the one or more groups of temporal related tasks into said central task queue to be executed according to their temporal relationship by one or more of the plurality of processors, wherein each of the protection attributes corresponding to a common instance of the multiple instances of the kernel is assigned to a common memory range of the memory ranges and protection attributes corresponding to different instances of the multiple instances of the kernel are assigned to respectively different memory ranges of the shared memory.

14. The method according to claim 13, further comprising the step of repeating steps e and f until there are no further idle processors or no further atomic sub-task in the central task queue.

15. The method according to claim 13, wherein the step d of scheduling the one or more atomic sub-tasks into the central task queue is done according to temporal considerations.

16. The method according to claim 13, wherein the step d of scheduling the one or more atomic sub-tasks into the central task queue is done according to priority considerations.

* * * * *